United States Patent [19]

Nass et al.

[11] Patent Number: 5,741,844

[45] Date of Patent: Apr. 21, 1998

[54] COATING COMPOSITION, PLASTER MATERIAL, METHOD FOR MAKING FRESCO-LIKE PLASTER WALL FINISH AND PLASTER WALL, CEILING, OR SURFACE FORMED THEREBY

[75] Inventors: Warren John Nass, North Barrington; Kurt Gutfreund, Park Forest; Eli S. Freeman, Buffalo Grove, all of Ill.

[73] Assignee: Warren J. Nass, North Barrington, Ill.

[21] Appl. No.: 850,649

[22] Filed: May 2, 1997

Related U.S. Application Data

[63] Continuation of Ser. No. 153,430, Nov. 16, 1993, abandoned.

[51] Int. Cl.$^6$ .................................. C08J 5/10; C08L 1/02
[52] U.S. Cl. .................................. 524/523; 524/2; 524/5; 524/8; 524/13; 524/423; 524/425; 524/445; 524/447; 524/449; 524/492; 524/493
[58] Field of Search .................................. 524/2, 5, 8, 13, 524/35, 423, 445, 425, 449, 492, 493, 447, 523

[56] References Cited

U.S. PATENT DOCUMENTS

| | | | |
|---|---|---|---|
| 3,913,917 | 10/1975 | Weiant et al. | 524/430 |
| 4,059,551 | 11/1977 | Weiant et al. | 524/430 |
| 4,088,804 | 5/1978 | Cornwell et al. | 428/220 |
| 4,142,911 | 3/1979 | Ellis et al. | 106/97 |
| 4,159,301 | 6/1979 | Buser et al. | 264/331 |
| 4,267,091 | 5/1981 | Geelhaar et al. | 260/29.6 TA |
| 4,330,458 | 5/1982 | Spinelli et al. | 524/512 |
| 4,339,365 | 7/1982 | Becher et al. | 523/400 |
| 4,351,912 | 9/1982 | Jasperson | 523/218 |
| 4,708,745 | 11/1987 | Schönhausen | 106/85 |
| 4,710,540 | 12/1987 | McAlpin | 525/101 |
| 4,946,715 | 8/1990 | Avera | 427/273 |
| 5,084,303 | 1/1992 | Avera | 427/263 |
| 5,122,395 | 6/1992 | Sandor | 427/262 |
| 5,164,433 | 11/1992 | Ricci et al. | 524/47 |
| 5,308,890 | 5/1994 | Snyder | 523/201 |

*Primary Examiner*—Vasu Jagannathan
*Assistant Examiner*—John J. Guarriello
*Attorney, Agent, or Firm*—Thomas R. Vigil

[57] ABSTRACT

A coating composition giving a fresco-like appearance when mixed with a cement based plaster comprises a latex polymer binder, acrylic polymer binder, or two acrylic polymer cross-linking binders, particulate matter and chemical agents. The plaster composition preferably comprises 35 to 45 percent by weight cement based plaster; 50 to 60 percent by weight coating composition, 2 to 8 percent by weight colorant. A method for preparing a the plaster composition and a plaster wall, ceiling, or other surface comprised of the plaster composition applied to an appropriate wall, ceiling, or surface is also disclosed.

10 Claims, 1 Drawing Sheet

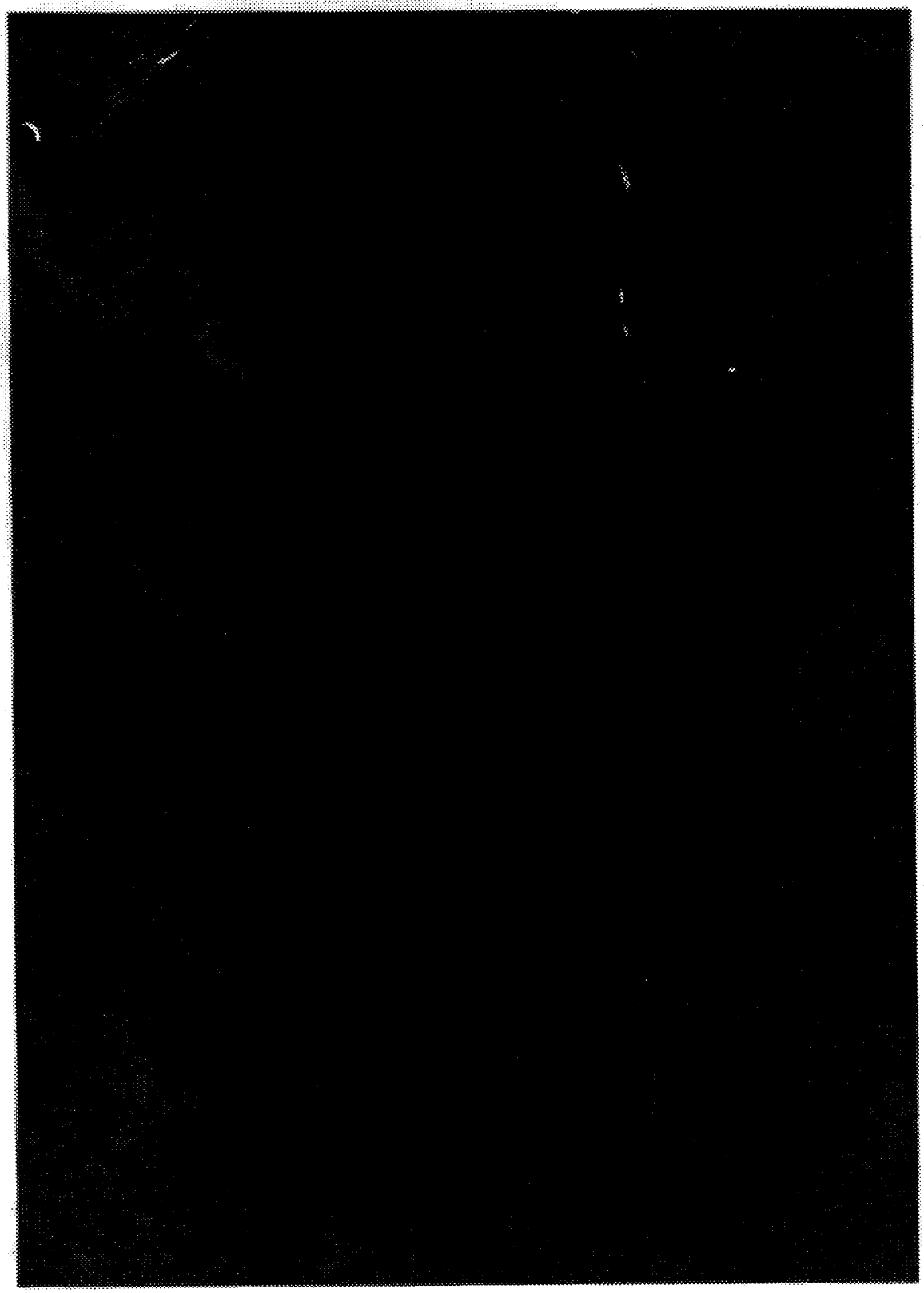

COATING COMPOSITION, PLASTER MATERIAL, METHOD FOR MAKING FRESCO-LIKE PLASTER WALL FINISH AND PLASTER WALL, CEILING, OR SURFACE FORMED THEREBY

This is a continuation of application Ser. No. 08/153,430 filed Nov. 16, 1993 now abandoned.

BACKGROUND OF THE INVENTION

1. Field of the Invention

The present invention relates to a plaster wall surface having a fresco-like appearance. More specifically, the present invention is directed to a coating composition, plaster material, a method for applying the plaster material to a wall to obtain a fresco-like finish and the fresco-like plaster wall surface created thereby.

2. Description of the Related Art Including Information Disclosed Under 37 CFR §§ 1.97–1.99.

Heretofore various techniques have been proposed for creating a wall finish that has random swirls or designs, e.g. marble-like, with varying color density, i.e., with lighter portions and darker portions of the same basic color.

A new technique for providing such a finish has been referred to as a faux finish and several methods for creating such finishes are disclosed in the in the following U.S. Patents:

| U.S. Pat. No. | Patentee |
| --- | --- |
| 4,946,715 | Ronald Avera |
| 5,084,303 | Ronald Avera |
| 5,122,395 | Raymond Sandor |

Before the advent of the faux finishes, fresco painting has been utilized for centuries to obtain a fresco finish; the fresco mural-painting technique involved painting permanent lime-proof pigments dispersed in water on freshly laid lime plaster.

In fresco paintings, mineral colors are applied in a thin (0.001–0.003-in.) layer to wet plaster surfaces and, as a result of environmental exposure to carbon dioxide, the calcium lime is converted to calcium carbonate which retains the pigment and on drying imparts to the surface a marble-like appearance. Fresco coatings which are applied by trowel or similar device have a thickness of 0.005–0.25 in. and these coatings exhibit, on drying, a marbled texture whose appearance is enhanced by the presence of a colorant (dye) and paper pulp additive in the formulation. The dye is absorbed preferentially on the hydrophilic fibers of the pulp thereby highlighting the visual attributes of the coating.

In a fresco, the pigments are absorbed into the wet wall by capillary action and become an integral part of the wall's surface. Indoors, on a properly prepared support, fresco is one of the most permanent painting techniques. Its colors are stable, not because they are protected by a calcareous film or "limeskin"—as formerly believed—, but because they are made with chemically inert pigments. Fresco is not adaptable to exterior murals; its chief enemies are polluted air and abrasion by windborne particles.

Fresco meets all the requirements for an ideal mural painting: it has a perfectly mat surface; its color effect is brilliant; it lends itself especially to monumental styles; and it ages nobly.

As will be described in greater detail hereinafter, the present invention provides a coating composition including a number of elements, a plaster material including the coating composition, a method for mixing and applying the plaster material and coating composition combination to a wall, a surface, or a ceiling to obtain a fresco-like finish, and a fresco-like plaster wall, surface, or ceiling formed thereby.

SUMMARY OF THE INVENTION

According to the present invention there is provided a coating composition comprising a binder or blend of binders selected from the group consisting of an emulsion polymer binder, a acrylic polymer binder, and two acrylic polymer cross-linking binders, water, particulate materials, and chemical agents.

Also according to the present invention there is provided a cement based plaster material comprising: 30 to 45 percent by weight cement plaster; 50 to 60 percent by weight coating composition comprising a binder or blend of binders selected from the group consisting of an emulsion polymer binder, an acrylic polymer binder, and two acrylic polymer cross-linking binders, water, particulate materials, and chemical agents; and 2 to 8 percent by weight colorant.

Still further according to the present invention there is provided a plaster wall, surface, or ceiling comprising: plaster; a colorant; and a coating composition.

The file of this patent contains at least one photograph executed in color. Copies of this patent with the color photograph will be provided by the Patent and Trademark Office upon request and payment of the necessary fee.

BRIEF DESCRIPTION OF THE DRAWINGS

FIG. 1 is a photograph of a fresco-like wall surface of the present invention.

DESCRIPTION OF THE PREFERRED EMBODIMENT(S)

Referring now to FIG. 1, there is depicted in the photograph a fresco-like finish obtained using a coating composition comprising a plurality of ingredients to give a slightly rough but yet smooth finish when mixed with plaster and a colorant using the method of the present invention described in greater detail hereinafter.

The coating composition is a mixture of a plurality of ingredients which are listed below:

| INGREDIENT | PERCENTAGE BY WEIGHT |
| --- | --- |
| Emulsion polymer binder, acrylic polymer binder, or two acrylic polymer cross-linking binders | 10–30% |
| Extenders | 10–30% |
| Filler | 5–20% |
| Water | 20–45% |
| Solvents | 6–15% |
| Coalescence promoters | 1–2% |
| Thickening agents | 5–15% |

The coating composition may also optionally employ the ingredients which are listed below:

| INGREDIENT | PERCENTAGE BY WEIGHT |
| --- | --- |
| Surfactants | 0.03–0.2% |
| Foam inhibitors | 0.1–0.3% |
| pH adjuster | 0.1–0.2% |

-continued

| INGREDIENT | PERCENTAGE BY WEIGHT |
|---|---|
| Biocides | 1–3% |
| Mildewcide | 0.1–0.5% |
| Colorant | 2–8% |

When prepared, the above fresco coating composition of the present invention has the consistency of heavy molasses, can be spread by trowel on a wall, a surface, or a ceiling to be coated (e.g. plaster, drywall, metal) to leave on it a thin layer of coating. The uniqueness of this coating lies in the fact that, in addition to its protection of the substrate against environmental influences, it imparts to the wall, surface, or ceiling the appearance of an ornamental fresco. However, unlike the frescoes of the famous Italian painters of the Renaissance period whose paintings had to be applied to wet plaster, the fresco coating of the present invention can be deposited on a dry substrate while still eliciting the desired optical effect.

A high molecular-weight organic binder which holds solid particulates in its matrix and prevents mechanical breakdown of the coating comprises an essential ingredient in the fresco formulation. The binder used for this purpose also facilitates the deposition of a smooth and adherent coating layer on a wall, ceiling or other surfaces, and it promotes development of a fresco texture. According to the present invention polymers that can be used in aqueous emulsions to accomplish this objective are acrylics, poly(vinyl acetate), poly(vinyl chloride), copolymers of styrene and butadiene, and polyurethanes.

The emulsion binding polymers of choice are the acrylic latex polymers including methyl methacrylate, butyl-or isobutyl-methacrylate their blends, and homologs with longer chain substituents. The use of an acrylic emulsion polymer is important in fresco coating of the present invention due to its pigment-binding capability in formulation of a marble-like texture and cast films. For example, the acrylic binder of the fresco coating composition of the present invention may include RHOPLEX MULTILOBE 200, an all-acrylic binder supplied by Rohm & Haas Co., Philadelphia, Pa, which imparts chalk resistance, adhesion and pigment retention to coatings in paint formulations. Other Rohm & Haas products of RHOPLEX AC-261, an acrylic emulsion polymer with abrasion resistance, RHOPLEX HG-74M, a styrene containing acrylic claimed to provide hardness in enamel-like coatings, and RHOPLEX WL-96 an acrylonitrile-containing latex with outstanding adhesion to metal and plastic surfaces, flexibility and mar resistance are all suitable acrylic emulsion polymers for the present invention.

RHOPLEX MULTILOBE 200 is an acrylic emulsion polymer typically comprised of 53 to 54% acrylic polymer, less than 1% of individual residual monomers, 0.2% maximum of aqua ammonia, and 46 to 47% water. It has a solid content of 53 to 54%, a pH of 8.5 to 9.2%, a viscosity of 300–1500 cps; a molecular weight greater than 1,000,000, a glass transition temperature of 9.0° C., a gel content (gm./qt.) at 100 mesh of 0.05 gm./qt. maximum and at 325 mesh 0.10 gm./qt. maximum, and a dry bulking value (lb./gal.) of 0.107.

RHOPLEX AC-261 is an acrylic emulsion polymer for latex floor paints typically comprising 49 to 51% of acrylic copolymer, less than 0.1% individual residual monomers, 0.2% maximum of ammonia, and 49 to 51% water. The solid content of acrylic copolymer of RHOPLEX AC-261 is 50% +/−0.5%. RHOPLEX AC-261 has a pH of 9.0–10.0, a viscosity of 100 to 500 cps (Brookfield Model LVT, #2 spindle at 60 r.p.m), a gel content at 100 mesh of 0.05 gm./qt. and at 325 mesh 0.10 gm./qt., a density, deaerated, of 8.82 lb./gal. and a dry bulking value of 0.106 gal./lb.

RHOPLEX HG-74M is an acrylic copolymer emulsion typically comprising 41 to 43% acrylic polymer, less than 0.1% individual residual monomers, 0.1% maximum ammonia and 57 to 59% water. RHOPLEX HG-74M has a milky-white liquid appearance, a solid content of 42%, a pH of 7.5 to 8.5%, a Brookfield Viscosity (#3 spindle, at 60 r.p.m.) of 800 cps, a density of 8.6 lb./gal., a bulking value of dry solids of 0.112 gal./lb., a specific gravity of 1.03 g/l and a minimum film formation temperature of 30° C.

The coating composition prepared with an emulsion polymer binder or acrylic polymer binder imparts a sufficient fresco-like finish to the coating composition when mixed with a cement based plaster, however use of two acrylic polymer cross-linking binders in the coating composition of the present invention yields a preferred superior fresco-like finish when mixed with cement based plaster. Apparently, the surface irregularities that contribute to the fresco pattern result from stress-induced dimensional changes within the plane of the coating layer likely attributed to the use of two reactive (crosslinking) acrylic compounds in the coating mixture. These dimensional changes can be attributed to the contraction of the coating during polymerization and crosslinking of the binder resin.

Blending of the two acrylic polymer binders becomes important where a certain degree of rigidity (hardness) or flexibility of the fresco coatings has to be maintained. In these instances, the combination of acrylic latexes with short- and long-chain substituents will result in coatings with a lesser or greater flexibility, respectively. The copolymers of substituted methacrylates show decreasing hardness and increasing flexibility for polymers with chain substituents of increasing length and frequency of occurrence. Thus, poly(methylmethacrylate) which is the primary compound in plastic window pane (Lucite, Plexiglass) is significantly harder than copolymers of methyl methacrylate (MMA) with butyl methacrylate (BuMA) or isopropyl methacrylate (IPMA).

The two cross-linking acrylic polymer binders may be selected from the group comprising: poly (methylmethacrylate), methylmethacrylate (MMA), butylmethacrylate (BuMa), isopropyl methacrylate (IPMA), and RHOPLEX MULTILOBE 200, RHOPLEX AC-261 RHOPLEX 186-74 or RHOPLEX WL-96. The preferred acrylic latex blend represents a mixture of 50% solids-containing poly(methyl)- and poly(butyl)-methacrylate in 2:1–1:5 weight proportions. The preferred amount of combined latexes ranges from 10–30 wt.-% per total weight of formulation ingredients, depending on the amount of filler and extender used.

Polyethylene glycol diacrylate and trimethyl triacrylate can be used as crosslinking agents to improve the structural properties of the acrylic emulsion polymers.

A latex coalescence-producing agent, such as TEXANOL available from the Eastman Chemical Products, Co., can be used with the binding polymer(s) of the present invention, such as with RHOPLEX AC-261, RHOPLEX HG-74M, and RHOPLEX WL-96 in the weight percentages of 5, 15 and 20% respectively to obtain cohesiveness (compaction, hardness). A formulation additive capable of enhancing coalescence of latex particles improves the physical and mechanical properties of film cast from the latex.

Furthermore, it is conceivable that better coalescence of the emulsion could result in visual differences of "islets" at the film surface, thereby producing effects of marbling in the coating, particularly in those instances where the acrylic polymer would show a greater tendency to dye absorption (staining) than the inorganic constituents in the coating.

The extender may include clay, titanium dioxide, silica, calcined clay, calcium carbonate, calcium sulfate and other water insoluble particulates and mixtures thereof. These extenders may comprise 10–30% of the total weight of ingredients. A preferred extender is powdered clay of the type which can be purchased from Whittaker, Clark & Daniels under the brand name of SNOW-BRITE CLAY.

The coating composition of the present invention includes thickening agents in the amount of 5–15% by weight. A preferred thickener is the type which can be purchased from Aqualon Co. under the brand name NATROSOL 250MHR.

The filler of the coating composition of the present invention is preferably fine silica sand for a primary base coating and is a pulp filler for second and/or finish coatings. The pulp filler is preferably paper pulp of 1–5 mm fiber length, and most preferably 1.5 to 3 mm fiber length as obtained from softwood, and is used in wet form in amounts of 5–20% by total weight of formulation ingredients. The use paper pulp as an additive in the fresco coating suggests the possibility of water migration from the coating to the underlying substrate through the wickening action of pulp fibers, thereby contributing to shrinkage of the surface layer and the fresco-causing effect of the surface. Alternatively, the pulp filler may comprise wood pulp. The presence of wood pulp in an amount of 5–20% enhances "marbling" of the coating in comparison with coating without wood pulp, particularly after introduction of a colorant into the system. Apparently, the greater affinity of the wood pulp toward the dye in comparison with inorganic (silica, cement, clay) sorbants, and the non-uniform distribution of the pulp in the system are responsible for the observed effects.

The coating composition of the present invention also includes solvents such as propylene glycol and methyl carbitol to reduce the drying time for the coating.

The formulation of the present invention is diluted with water (20–45 wt.-%) to obtain a slurry-like consistency and permit its reaction with Portland cement.

The coating composition of the present invention may also optionally include a number of additional ingredients. Particularly, surfactants may be added in the amount of 0.03 to 0.2% by weight of the formulation. A preferred surfactant is available from Union Carbide Co. under the brand name SILWET L-77. A foam inhibitor may also be included in the amount of 0.1–0.3% by weight of formulation. A preferred foam inhibitor is available from Dow Chemical Co. under the brand name ANTIFOAM-1410. Additionally, a pH adjuster, biocide, and mildewcide may be included in the composition of the present invention.

After the coating composition of the present invention has been prepared, then pigment (dye) or other tint or colorant preferably in the amount of one ounce colorant per pound of coating composition may be added to the coating composition to impart to the total formulation the desired color.

Prior to the introduction of cement to the coating composition, the formulation ingredients including the colorant are preferably mixed for 15–20 min. using high rate, high-shear mixing equipment. The cement plaster then is admixed to the formulation in weight proportions of 1:1 to 2:5 for cement and coating composition respectively. The cement is preferably Portland Cement but use of Keene's Cement, White Portland Cement, or White Medusa Cement may be appropriate in some applications. Portland Cement is preferable as it is readily available, does not set fast, and is good to use in aqueous environments.

For example, a coating composition according to the present invention may be mixed with a colorant and a cement in the following ratios: 10 ounces of colorant, such as sold by Benjamin Moore Paint Company, and 7 pounds of plaster to 10 pounds of coating composition. The above ingredients for the plaster composition are thoroughly mixed. Then it is allowed to sit for approximately five minutes to allow it to "take up" or "tighten".

Then it is remixed thoroughly for one minute and is ready to apply.

A first base or "primer" coat of the batch of the plaster composition is troweled evenly and smooth on a flat surface and allowed to set and dry for 24 hours. This primer coat utilizes fine silica sand as a filler instead of paper pulp or wood pulp (see Table 4 hereinafter). Then a second or "finish" coat is applied with circular and irregular troweling to obtain a fresco-like, or marble like, finish. The finish coat uses paper pulp or wood pulp as a pulp filler.

The resulting plaster wall finish is shown in FIGS. 1 and 2 and is not only very attractive but also has a number of advantages.

First of all, since the color extends completely through both the first/primer and second/finish coatings, this plaster wall surface is ideally suited for indoor use.

Secondly, since the color extends completely through the material, whenever there is an abrasion or mark on the wall surface, it can be easily repaired by sanding the wall in the area of the mark or abrasion with a very fine sandpaper, e.g. 600 to 2,000 grade sandpaper.

Thirdly, by having a latex base the plaster wall, ceiling, or surface can be washed with soap and water.

EXAMPLES

The preferred coating composition of the present invention includes two reactive cross-linking acrylic compounds in the coating mixture. Table 1 and Table 2 below set forth examples of the preferred "finish" fresco coating composition having two acrylic polymer cross-linking binders with ingredients and amounts required to prepare 10 and 50-lb. batches:

TABLE 1

FRESCO COATING COMPOSITION
(Formulated for addition of cement batch)

| INGREDIENT | FUNCTION | MANUFACTURE | AMOUNT gram | Wt-% partial | Amount for 10-lb (lbs) | Amount for 50-lb (lb) |
| --- | --- | --- | --- | --- | --- | --- |
| NATROSOL 250 MHR | Thickener | Aqualon Co. | 12.00 | 5.58 | 0.56 | 2.79 |
| Propylene glycol | Solvent | Aldrich Chem. Co. | 3.06 | 1.42 | 0.14 | 0.71 |
| Methyl carbitol | Solvent | Aldrich Chem. Co. | 25.80 | 11.99 | 1.20 | 6.00 |
| SILWET L-77 | Surfactant | Union Carbide Co. | 0.15 | 0.07 | 0.01 | 0.03 |
| SNOW-BRITE CLAY | Extender | Whittaker, Clark & Daniels | 24.80 | 11.53 | 1.15 | 5.76 |
| Methyl carbitol | Solvent | Aldrich Chem. Co. | | | | |
| Water | | | 83.15 | 38.65 | 3.86 | 19.32 |
| Paper pulp | Filler | Donco Paper Co. | 11.3 | 5.25 | 0.53 | 2.63 |
| RHOPLEX AC-261 | Acrylic binder | Rohm & Haas | 15.00 | 6.97 | 0.70 | 3.49 |
| RHOPLEX MULTILOBE 200 | Acrylic Binder | Rohm & Haas | 36.5 | 16.96 | 1.70 | 8.48 |
| TAXANOL | Coalescent | Eastman Chemical Co. | 3.00 | 1.39 | 0.14 | 0.70 |
| ANTIFOAM-1410 | Defoamer | Dow Chemical Co. | 0.40 | 0.19 | 0.02 | 0.09 |

TABLE 2

FRESCO COATING COMPOSITION
(Formulated for addition of cement batch)

| INGREDIENT | FUNCTION | MANUFACTURE | AMOUNT gram | Wt-% partial | Amount for 10-lb (lbs) | Amount for 50-lb (lb) |
| --- | --- | --- | --- | --- | --- | --- |
| NATROSOL 250 MHR | Thickener | Aqualon Co. | 18.00 | 6.40 | 0.64 | 3.20 |
| Propylene glycol | Solvent | Aldrich Chem. Co. | 4.59 | 1.63 | 0.16 | 0.82 |
| Methyl carbitol | Solvent | Aldrich Chem. Co. | 38.70 | 13.76 | 1.38 | 6.88 |
| SILWET L-77 | Surfactant | Union Carbide Co. | 0.23 | 0.08 | 0.01 | 0.04 |
| SNOW-BRITE CLAY | Extender | Whittaker, Clark & Daniels | 37.20 | 13.23 | 1.32 | 6.62 |
| Water | | | 83.15 | 29.57 | 2.96 | 14.79 |
| Paper pulp | Filler | Donco Paper Co. | 16.95 | 6.03 | 0.60 | 3.01 |
| CR-750 Styrene-acrylic | Binder | B. F. Goodrich | 10.00 | 3.56 | 0.36 | 1.78 |
| RHOPLEX AC-261 | Acrylic binder | Rohm & Haas | 12.5 | 4.45 | .44 | 2.22 |
| RHOPLEX MULTILOBE 200 | Acrylic binder | Rohm & Haas | 54.75 | 19.47 | 1.95 | 9.74 |
| TAXANOL | Coalescent | Eastman Chemical Co. | 4.50 | 1.60 | 0.16 | 0.80 |
| ANTIFOAM-1410 | Defoamer | Dow Chemical Co. | 0.60 | 0.21 | 0.02 | 0.11 |

Since the presence of organic compounds in fresco coatings increases their susceptibility to deterioration as a result of microorganic action, it is desirable to include a biocide in coating formulations to preserve the coating during storage and prevent its degradation through bacterial and fungal action.

Among compounds that are capable of accomplishing this objective are the water-based nonmetallic preservatives 5-hydroxymethoxymetyl-1-aza-3, 7 dioxybicyclo(3.3.0) octane, and tetrachloroisophthaTonirile. These preservatives are commercially available from Huls America, Inc. under the trade names of NUOSEPT-95 and NUOCIDE 404D, respectively. The first compound is a bactericide that is used in amounts of 1.0–2.8% by weight of coating, while the second compound is a fungicide/mildewcide used at 0.1–0.5 wt-%.

An example of the finish fresco coating formulation containing these shelf-life extending preservatives are listed in Table 3 below:

TABLE 3

FRESCO COATING COMPOSITION
(Formulated with preservatives)

| INGREDIENT | FUNCTION | MANUFACTURE | AMOUNT gram | Wt-% partial | Amount for 10-lb (lbs) | Amount for 50-lb (lb) |
| --- | --- | --- | --- | --- | --- | --- |
| NATROSOL 250 MHR | Thickener | Aqualon Co. | 12.00 | 5.73 | 0.57 | 2.86 |
| Propylene glycol | Solvent | Aldrich Chem. Co. | 3.06 | 1.46 | 0.15 | 0.73 |
| Methyl carbitol | Solvent | Aldrich Chem. Co. | 25.80 | 12.31 | 1.23 | 6.15 |
| SILWET L-77 | Surfactant | Union Carbide Co. | 0.15 | 0.07 | 0.01 | 0.04 |
| SNOW-BRITE CLAY | Extender | Whittaker, Clark & Daniels | 24.80 | 11.88 | 1.18 | 5.92 |
| Water | | | 76.45 | 38.48 | 3.65 | 18.24 |
| Paper pulp | Filler | Donco Paper Co. | 11.3 | 5.89 | 0.54 | 2.20 |
| RHOPLEX AC-261 | Acrylic binder | Rohm & Haas | 12.99 | 6.25 | 0.62 | 3.10 |

TABLE 3-continued

FRESCO COATING COMPOSITION
(Formulated with preservatives)

| INGREDIENT | FUNCTION | MANUFACTURE | AMOUNT gram | Wt-% partial | Amount for 10-lb (lbs) | Amount for 50-lb (lb) |
|---|---|---|---|---|---|---|
| RHOPLEX MULTILOBE 200 | Acrylic binder | Rohm & Haas | 36.5 | 17.41 | 1.74 | 8.71 |
| TEXANOL | Coalescent | Eastman Chemical Co. | 3.00 | 1.43 | 0.14 | 0.72 |
| ANTIFOAM-1410 | Defoamer | Dow Chemical Co. | 0.40 | 0.19 | 0.02 | 0.10 |
| NUOCIDE 404D | Biocide | Huls America, Inc. | 2.89 | 1.38 | 0.66 | 0.63 |
| NUOSEPT-95 | Mildewcide | Huls America, Inc. | 0.25 | 0.11 | 0.06 | 0.06 |

Any of the Fresco coating compositions set forth in Tables 1, 2, and 3 above, can also be used in conjunction with a primer base coating composition. As previously noted the primer base coat utilizes fine silica sand as a filler instead of a pulp filler such as paper pulp or wood pulp. An example of a primer base coat according to the present invention for Fresco coating compositions of the present invention is set forth below as Table 4:

TABLE 4

PRIMER BASE COAT FOR FRESCO COATING COMPOSITION

| INGREDIENTS | FUNCTION | MANUFACTURE | WT-% PARTIAL | AMOUNT FOR 50 lb. BATCH |
|---|---|---|---|---|
| NATROSOL 250 MHR | Thickener | Aqualon Co. | 4.96 | 2.48 |
| Propylene Glycol | Solvent | Aldrich Chem. Co. | 1.26 | 0.63 |
| Methyl Carbitol | Solvent | Aldrich Chem. Co. | 10.70 | 5.35 |
| SILWET L-77 | Surfactant | Union Carbide Co. | 0.06 | 0.03 |
| SNOW-BRIGHT CLAY | Extender | Whittaker, Clark & Daniels | 10.30 | 5.15 |
| Water | | | 31.72 | 15.86 |
| Fine Silica Sand | Filler | Wedron Silica Co. | 17.76 | 8.88 |
| RHOPLEX AC-261 | Acrylic Binder | Rohm & Haas | 5.38 | 2.69 |
| RHOPLEX MULTILOBE 200 | Acrylic Binder | Rohm & Haas | 15.14 | 7.57 |
| TEXANOL | Coalescent | Eastman Chem. Co. | 1.24 | 0.62 |
| ANTIFOAM-1410 | Defoamer | Dow Chemical Co. | 0.18 | 0.09 |
| NUOCIDE 404D | Biocide | Huls America, Inc. | 1.20 | 0.60 |
| NUOSEPT-95 | Mildewcide | Huls America, Inc. | 00.10 | 0.05 |
| | | | | 50.00 |

Each of the finish Fresco coating compositions of Tables 1, 2, and 3 above, and the primer base coating composition of Table 4 above are formulated for the addition of a cement batch. When the coating composition has been made, the composition is then thoroughly mixed for approximately 20 minutes. Once so mixed, the composition is ready for the addition of a cement batch. The cement, preferably Portland cement, is admixed to the coating composition of Tables 1, 2, or 3 above in a weight proportion of 1:1 to 2:5 for cement to coating composition respectively, and preferably is mixed in the amount of 7 pounds of cement to 10 pounds of coating composition.

In contradistinction to the preferred coating compositions of Tables 1 through 4 above having two acrylic polymer cross-linking binders, the following finish coating compositions described in Table 5 (Partial A) and Table 6 through 9 employ a single binder. Single binder compositions did not have the hardness and consistency of the two acrylic polymer cross-linking binder formulations. Examples of single binder formulations are set forth below Table 5 (Partial A) and Table 6 through 9:

TABLE 5

FRESCO COATING COMPOSITION

| INGREDIENT | FUNCTION | MANUFACTURE | TOTAL | | |
|---|---|---|---|---|---|
| | | | | | Partial A |
| NATROSOL 250 MHR | Thickener | Aqualon Co. | 11.8 | | 21.57 |
| Ethylene glycol | Solvent | Fisher Chem. Co. | 2.4 | | 4.39 |
| Propylene glycol | Solvent | Fisher Chem. Co. | 3.4 | | 6.21 |
| Taxol-1124 | Dispersant | Rohm & Haas | 0.44 | | 0.80 |
| Triton-CF10 | Surfactant | | 0.1 | | 0.18 |
| Colloid-643 | Defoamer | Colloids, Inc. | 0.19 | | 0.35 |
| Ti-pure R902 | TiO2 | DuPont | 14.4 | | 26.32 |
| Minex 4 | Silicate, ext. | Indusmin, Inc. | 4.8 | | 8.77 |
| Icecap K | Extender | Unimin Spec. Chemicals | 1.4 | | 2.56 |
| RHOPLEX MULTILOBE 200 | Acrylic Binder | Rohm & Haas | 11.48 | | 20.98 |
| Celite 281 | Diatom. silica | Johns Manville Co. | 4.3 | 54.71 | 7.86 |
| | | | | | Partial B |
| RHOPLEX MULTILOBE 200 | Acrylic Binder | Rohm & Haas | 32.3 | | 71.32 |
| Texanol | Coalescent | Eastman Chemical Co. | 1.1 | | 2.43 |
| Colloid | Defoamer | Colloids, Inc. | 0.19 | | 0.42 |
| Natrosol 250 MHR | Thickener | Aqualon Co. | 4.71 | | 10.40 |
| Ammonia (28%) | pH adjuster | Fisher Chemical Co. | 0.06 | | 0.13 |
| Water | | | 6.93 | 45.29 | 15.00 |
| | | | | 100 | |

TABLE 6

FRESCO COATING COMPOSITION

| INGREDIENT | FUNCTION | MANUFACTURE | AMOUNT gram | Wt-% partial | Total | |
|---|---|---|---|---|---|---|
| NATROSOL 250 MHR | Thickener | Aqualon Co. | 12.00 | 14.34 | 10.91 | |
| Glycerine | Solvent | Fisher Chem. Co. | 6.00 | 7.17 | 5.45 | |
| KELCO | Dispersant | KELCO CO. | 0.40 | 0.48 | 0.36 | |
| Triton-CF10 | Surfactant | | 0.10 | 0.12 | 0.09 | |
| SIL | Defoamer | Union Carbide Co. | 0.20 | 0.24 | 0.18 | |
| Silica | Extender | | 4.30 | 5.14 | 3.91 | |
| SNOW-BRITE CLAY | Extender | H. B. Fuller Co. | 20.20 | 24.13 | 18.36 | |
| RHOPLEX MULTILOBE 200 | Acrylic Binder | Rohm & Haas | 16.70 | 19.95 | 15.18 | |
| Water | | | 13.70 | 16.37 | 12.45 | |
| Wet Pulp | | | 10.10 | 12.07 | 9.18 | |
| | | | 83.70 | 100.00 | 76.09 | |
| | | Grind ingredients 20 min. then add: | | | | |
| | | | | | | mixture/cement wt-% |
| Cement | | Portland Cement Co. | 8.80 | 33.46 | 8.00 | 60.69 |
| Mixture | | | 14.50 | 5.13 | 13.18 | |
| Water | | | 3.00 | 11.41 | 2.73 | |

TABLE 7

FRESCO COATING COMPOSITION

| INGREDIENT | FUNCTION | MANUFACTURE | AMOUNT gram | Wt-% partial | Total | |
|---|---|---|---|---|---|---|
| NATROSOL 250 MHR | Thickener | Aqualon Co. | 12.00 | 11.76 | 7.68 | |
| Glycerine | Solvent | Fisher Chem. Co. | 6.00 | 5.88 | 3.84 | |
| KELRAN, guar gum | Dispersant | KELCO CO. | 0.40 | 0.39 | 0.26 | |
| SILWET L-77 | Surfactant | Union Carbide Co. | 0.10 | 0.12 | 0.06 | |
| ANTIFOAM 1410 | Defoamer | Dow Corning Corp. | 0.20 | 0.20 | 0.13 | |
| Silica | Extender | | 4.30 | 4.22 | 2.75 | |
| SNOW-BRITE CLAY | Extender | H. B. Fuller Co. | 20.20 | 19.80 | 12.92 | |
| RHOPLEX MULTILOBE 200 | Acrylic Binder | Rohm & Haas | 16.70 | 16.37 | 10.68 | |
| Water | | | 32.00 | 31.37 | 20.47 | |
| Wet Pulp | | | 10.10 | 9.90 | 6.46 | |
| | | | 102.00 | 100.00 | 65.26 | |
| | | Grind ingredients 20 min. then add: | | | | |
| | | | | | | mixture/cement wt-% |
| Cement | | Portland Cement Co. | 8.80 | 16.21 | 5.63 | 60.69 |
| Mixture | | | 14.50 | 26.70 | 9.28 | |
| Water | | | 31.00 | 57.09 | 19.83 | |
| | | | 54.30 | | 34.74 | 100.00 |

TABLE 8

FRESCO COATING COMPOSITION

| INGREDIENT | FUNCTION | MANUFACTURE | AMOUNT gram | Wt-% partial | Total | |
|---|---|---|---|---|---|---|
| NATROSOL 250 MHR | Thickener | Aqualon Co. | 12.00 | 13.93 | 8.64 | 0.72 |
| Propylene glycol | Solvent | Aldrich Chem. Co. | 3.20 | 3.71 | 8.06 | |
| Methyl carbitol | Solvent | Aldrich Chem. Co. | 3.00 | 3.48 | 7.26 | |
| KELZAN, guar gum | Dispersant | KELCO CO. | 0.20 | 0.23 | 0.14 | |
| SILWET L-77 | Surfactant | Union Carbide Co. | 0.15 | 0.17 | 0.11 | |
| Silica | Extender | | 4.10 | 4.76 | 2.95 | |
| SNOW-BRITE CLAY | Extender | H. B. Fuller Co. | 20.40 | 23.58 | 14.65 | |
| Methyl carbitol | Solvent | Aldrich Chem. Co. | 8.3 | 9.63 | 13.17 | |
| Water | | | 11.7 | 13.58 | 13.46 | |
| Wet pulp | Filler | | 7.2 | 8.36 | 5.18 | |
| RHOPLEX MULTILOBE 200 | Acrylic Binder | Rohm & Haas | 15.70 | 18.22 | 11.30 | |
| ANTIFOAM 1410 | Defoamer | Dow Chemical Co. | 0.20 | 0.23 | 0.14 | |
| | | | 86.15 | 100.00 | 85.08 | |
| | | Grind ingredients 20 min. then add: | | | | |
| | | | | | | mixture/cement wt-% |
| Cement | | Portland Cement Co. | 8.80 | 16.67 | | 60.69 |
| Batch #1 | | Batch #1 | 15.00 | 28.41 | | |
| Methyl carbitol | | Aldrich Chem. Co. | 7.00 | 13.26 | | |
| Propylene glycol | | Aldrich Chem. Co. | 8.00 | 15.15 | | |
| Water | | | 14.00 | 26.52 | | |
| | | | 52.80 | 100.00 | | 58.67 |

TABLE 9

FRESCO COATING COMPOSITION

| INGREDIENT | FUNCTION | MANUFACTURE | AMOUNT gram | Wt-% partial | Total | |
|---|---|---|---|---|---|---|
| TEXANOL | Coalescent | Eastman Chem. Products | 2.20 | 2.49 | 1.56 | 0.72 |
| NATROSOL 250 MHR | Thickener | Aqualon Co. | 12.00 | 13.58 | 8.50 | |

TABLE 9-continued

FRESCO COATING COMPOSITION

| INGREDIENT | FUNCTION | MANUFACTURE | AMOUNT gram | Wt-% partial | Total | |
|---|---|---|---|---|---|---|
| Propylene glycol | Solvent | Aldrich Chem. Co. | 3.20 | 3.62 | 7.88 | 0.71 |
| Methyl carbitol | Solvent | Aldrich Chem. Co. | 3.00 | 3.40 | 12.96 | |
| KELZAR, guar gum | Dispersant | KELCO CO. | 0.20 | 0.23 | 0.14 | |
| SILWET L-77 | Surfactant | Union Carbide Co. | 0.15 | 0.17 | 0.11 | |
| Silica | Extender | | 4.10 | 4.64 | 2.97 | |
| SNOW-BRITE CLAY | Extender | H. B. Fuller Co. | 20.40 | 23.09 | 14.45 | |
| Methyl carbitol | Solvent | Aldrich Chem. Co. | 8.3 | 9.39 | 0.00 | |
| Water | | | 11.7 | 13.24 | 8.29 | |
| Wet pulp | Filler | | 7.2 | 8.15 | 5.30 | |
| RHOPLEX HG-74M | Acrylic Binder | Rohm & Haas | 15.70 | 17.77 | 11.12 | |
| ANTIFOAM 1410 | Defoamer | Dow Chemical Co. | 0.20 | 0.23 | 0.14 | |
| | | | 88.35 | 100.00 | 73.16 | |

Grind ingredients 20 min. then add:

| | | | | | | mixture/cement wt-% |
|---|---|---|---|---|---|---|
| Cement | | Portland Cement Co. | 8.80 | 16.67 | | 60.69 |
| Batch #1 | | Batch #1 | 15.00 | 28.41 | | |
| Methyl carbitol | | Aldrich Chem. Co. | 7.00 | 13.26 | | |
| Propylene glycol | | Aldrich Chem. Co. | 8.00 | 15.15 | | |
| Water | | | 14.00 | 26.52 | | |
| | | | 52.80 | 100.00 | | 58.67 |

The coating compositions of Tables 1 through 9 above were field tested by applying the subject coating to a 1 foot by 1 foot ⅛th inch thick pressed-wood sample plate. In each instance of field testing, the following procedure was used. First, a primer base coat according to the primer coating composition of Table 4 was applied to a sample plate and allowed to set and dry for 24 hours. Then a finish Fresco coating composition (i.e. the compositions as set forth in Tables 1 through 3, Table 5 Partial A, and Tables 6 through 9 above) was admixed with colorant in the ratio of 1 ounce of colorant per pound of coating composition and thoroughly mixed for twenty minutes. Next, the finish Fresco coating composition was admixed with Portland Cement in the amount of 7 pounds of cement per 10 pounds of coating composition. Then, the finish Fresco coating composition was applied to a sample plate containing the dried primer base coat with circular and irregular troweling to obtain a preliminary Fresco-like or marble like, finish. Upon drying of the cement based plaster composition, the application procedure was repeated again with circular and irregular troweling to this time obtain a final Fresco-like finish. Once the second troweling tightened into a final finished product, the final Fresco plaster produced by the finish Fresco coating compositions on the sample plates was visually inspected for consistency and manually scratch-tested for hardness.

The finish Fresco coating compositions of Tables 1, 2, and 3 proved clearly superior to the finish Fresco coating compositions of Table 5 (Partial A) and Table 6 through 9 as each of the two acrylic polymer cross-linking binder formulations demonstrated upon visual inspection a high consistency without observed crazing or shrinkage marks and upon a manual scratch-testing a firm hardness resistant to scratching under normal use conditions.

The Fresco coating composition of Table 5 was prepared in two portions, mainly Partial A and Partial B as listed above. The finish Fresco coating composition of Table 5 Partial A as well as the finish Fresco coating compositions of Tables 6 through 9 each used a single acrylic binder. Each of these finish Fresco coating compositions yielded a final Fresco plaster having a Fresco-like coating appearance on the primer base coated sample plates during the field testing thereof, however each of the final Fresco plasters of these single binder finish coating compositions (1) were more difficult to trowel spread on the sample plate than the two acrylic polymer cross-linking binder compositions, (2) had present crazing and shrinkage marks in scattered areas of the final Fresco plaster which were observable upon a close visual inspection, and (3) were easily scratched upon relatively light contact during the manual scratch-testing. Thus, although the single acrylic binder formulations of the Fresco coating compositions of Table 5 (Partial A) and Table 6 through 9 were suitable to produce a final Fresco plaster having a Fresco-like coating appearance, the final Fresco plaster of the two acrylic polymer cross-linking binder coating compositions of Tables 1 through 4 were superior having a high consistency without observed crazing or shrinkage marks and a firm hardness resistant to scratching under normal use conditions.

From the foregoing description, it will be apparent that the plaster wall surface, the ingredients from which it is made and the manner and method by which it is created have a number of advantages, some of which have been described above and others of which are inherent in the invention.

Furthermore, modifications can be made to the composition of the plaster wall, ceiling, or other surface and the mixture of materials and ingredients used to make the plaster wall, ceiling, or other surface without departing from the teachings of the present invention. Accordingly, the scope of the invention is only be limited as necessitated by the accompanying claims.

We claim:

1. A fresco coating composition which, when admixed, with a cement-based plaster produces a material for application by troweling to obtain a fresco finish, said composition being made by combining:

a) 10 to 30% by weight of at least one binder selected from the group consisting of an acrylic emulsion polymer binder, an acrylic polymer binder and an acrylic polymer cross-linking binder;

b) 20 to 45% by weight of water;

c) 5 to 20% by weight of a filler selected from the group consisting of cellulose, paper pulp, mixtures thereof and fine silica sand;

d) 10 to 30% by weight of at least one water-insoluble particulate extender; and e) optionally, at least one non-reacting chemical agent selected from the group consisting of solvents, coalescence promoters, 5–15 wt.% thickening agents, surfactants, foam inhibitors, pH adjusters, biocides, mildewcides, colorants and mixtures thereof.

2. The coating composition of claim 1 consisting essentially of the following ingredients:

| INGREDIENT | PERCENTAGE BY WEIGHT |
|---|---|
| said acrylic polymer binder, acrylic polymer binder, or two acrylic polymer cross-linking binders | 10–30% |
| said Extender(s) | 10–30% |
| said Filler | 5–20% |
| said Water | 20–45% |
| said Solvent(s) | 6–15% |
| said Coalescence promoter(s) | 1–2% |
| said Thickening agent(s) | 5–15% |

3. The coating composition of claim 2 wherein said extender(s) is clay, titanium dioxide, silica, calcined clay, calcium carbonate, calcium sulfate and mixtures thereof.

4. The coating composition of claim 2 wherein said extender is fine silica sand of 430 microns or less.

5. The coating composition of claim 2 wherein said filler is fine silica sand.

6. The coating composition of claim 2 wherein said paper pulp is of 1–5 mm fiber length.

7. The coating composition of claim 6 wherein said paper pulp is of 1.5 to 3 mm fiber length as obtained from softwood and used in wet form.

8. The coating composition of claim 2 wherein said polymer binder is selected from the group consisting of acrylic polymers, poly(vinyl acetate), poly(vinyl chloride), copolymers of styrene and butadiene, and polyurethanes.

9. The coating composition of claim 8 wherein said polymer binder is an acrylic polymer selected from the group consisting of methyl methacrylate, butyl-methacrylate or isobutyl-methacrylate.

10. The coating composition of claim 2 wherein said two acrylic polymer cross-linking binders are an acrylic latex blend containing poly (methyl-methacrylate) and poly (butyl-methacrylate) in 2:1 to 1:5 weight proportions.

* * * * *

UNITED STATES PATENT AND TRADEMARK OFFICE
CERTIFICATE OF CORRECTION

PATENT NO. : 5,741,844
DATED : April 21, 1998
INVENTOR(S) : Warren J. Nass, Kurt Gutfreund and Eli S. Freeman It is certified that error appears in the above-indentified patent and that said Letters Patent is hereby corrected as shown below:

Column 17, line 15, "consisting essentially of" should be --made by combining--;
Column 17, line 20, first line in Table delete "10-30%";
Column 17, line 22, first, second and third lines in Table should be --said acrylic polymer binder, acrylic polymer binder, or acrylic polymer cross-linking binders 10-30%--;
In the abstract, line 8, after "a" delete --the--;
Column 1, line 26, after "in the" delete (2nd occurence)
Column 2, line 1, delete "10-30%";
Column 2, line 3, insert under percent by weight --10-30%--;
Column 2, line 2, delete "two";
Column 5, line 26, after "use" insert --of--
Colun 7, line 11, Table 1, "TAXANOL" should be --TEXANOL--;
Column 7, line 11, Table 2, "TAXANOL" should be --TEXANOL--.

Signed and Sealed this

Fifteenth Day of May, 2001

Attest:

NICHOLAS P. GODICI

Attesting Officer     Acting Director of the United States Patent and Trademark Office